US012602961B2

(12) United States Patent (10) Patent No.: US 12,602,961 B2
Raghavan et al. (45) Date of Patent: Apr. 14, 2026

(54) ELECTRONIC DEVICES AND CORRESPONDING METHODS FOR GENERATING AND TRANSMITTING ELECTRONIC ENTRY SYSTEM CONTROL COMMUNIQUES

(71) Applicant: Motorola Mobility LLC, Chicago, IL (US)

(72) Inventors: Krishnan Raghavan, Bengalore (IN); Vignesh Karthik Mohan, Bangalore (IN); Rahul Sahadevan, Kerala (IN)

(73) Assignee: Motorola Mobility LLC, Chicago, IL (US)

( * ) Notice: Subject to any disclaimer, the term of this patent is extended or adjusted under 35 U.S.C. 154(b) by 57 days.

(21) Appl. No.: 18/374,504

(22) Filed: Sep. 28, 2023

(65) Prior Publication Data

US 2025/0111722 A1    Apr. 3, 2025

(51) Int. Cl.
G06Q 10/0833 (2023.01)
G06Q 10/083 (2023.01)
(Continued)

(52) U.S. Cl.
CPC ............. G07C 9/21 (2020.01); G06Q 10/083 (2013.01); H04W 4/025 (2013.01)

(58) Field of Classification Search
CPC ... H04L 67/55; H04L 9/3231; H04L 2209/56; H04L 2209/60; H04L 2209/805; H04L 2463/101; H04L 2463/102; H04L 2463/103; H04L 63/08; H04L 63/0876;

H04L 63/20; H04L 9/3263; H04L 63/06; H04L 63/083; H04L 63/123; H04L 63/126; H04L 63/18; H04L 9/0825; H04L 9/0866;
(Continued)

(56) References Cited

U.S. PATENT DOCUMENTS 7,341,186 B2 *   3/2008  Mrozik .................. G06Q 10/08
                                                  235/384
10,498,538 B2 *  12/2019  Mani .................. G07C 9/00563
(Continued)

OTHER PUBLICATIONS

"How to add expected visitor using the ADDA App?", Help Desk; Available online at https://support.adda.io/portal/en/kb/articles/how-to-add-expected-visitor-in-adda-app ; Unknown Exact Publication Date but believed to be prior to filing of present application.
(Continued)

*Primary Examiner* — Dionne Pendleton

(57) ABSTRACT

An electronic device includes a communication device, a user interface, and one or more processors operable with the communication device and user interface. The one or more processors extract, from an electronic communication relating to a parcel delivery received by the communication device, one or more delivery event relevant data fields that include at least a parcel delivery location and a parcel delivery location and cause the communication device to transmit an electronic entry system control communique allowing entry through an entry control system situated at the parcel delivery location at the parcel delivery time to the entry control system. The electronic entry system control communique may only be valid for a predefined duration spanning the parcel delivery time.

20 Claims, 8 Drawing Sheets

(51) Int. Cl.
*G07C 9/21* (2020.01)
*H04W 4/02* (2018.01)

(58) Field of Classification Search
CPC ... H04L 9/0894; H04L 9/3218; H04L 9/3236; H04L 9/3247; H01L 2224/48091; A61K 38/00; A01D 34/008; G06N 20/00; G06N 3/08; G06F 3/0482; G06F 3/04842; G06F 3/04847; G06F 21/32; G06F 21/6209; G06F 12/1408; G06F 21/109; G06F 21/16; G06F 21/31; G06F 21/33; G06F 21/86; G06F 2211/007; G06F 2221/2101; G06F 2221/2115; G06F 2221/2135; G06F 2221/2151; G06F 21/1015; G06F 21/106; G06F 21/602; G06F 21/6218; G06F 21/6245; G06F 21/6281; G06F 21/64; G05D 1/0088; G05D 1/0246; G05D 1/0255; G05D 1/0257; G05D 1/027; G05D 1/0278; G05D 1/228; G05D 1/247; G05D 1/248; G05D 1/249; G05D 1/0212; G05D 1/0274; G05D 1/028; G05D 1/0676; G05D 1/0022; G05D 1/042; G05D 1/102; G08G 1/20; G08G 1/205; G08G 5/22; G08G 5/26; G08G 5/55; G08G 5/57; G08G 5/32; G08G 5/54; G08G 5/59; G01M 17/007; G01M 17/0074; G01M 17/045; G01M 17/065; G06Q 10/109; G06Q 30/02; G06Q 10/08; G06Q 10/0833; G06Q 10/083; G06Q 20/02; G06Q 10/0832; G06Q 10/0835; G06Q 10/087; G06Q 20/023; G06Q 20/04; G06Q 20/10; G06Q 20/12; G06Q 20/123; G06Q 20/1235; G06Q 20/24; G06Q 20/389; G06Q 20/401; G06Q 30/0633; G06Q 10/08345; G06Q 10/08355; G06Q 10/0838; G06Q 20/18; G06Q 20/203; G06Q 30/00; G06Q 30/0261; G06Q 30/06; G06Q 30/0601; G06Q 30/0613; G06Q 30/0615; G06Q 30/0617; G06Q 30/0635; G06Q 30/0637; G06Q 30/0641; G06Q 30/08; G06Q 10/0836; G06Q 10/1093; G06Q 40/02; G06Q 50/40; G06Q 50/60; G08B 21/0261; G08B 21/0283; G08B 13/19608; H04W 4/023; H04W 4/022; H04W 4/021; H04W 4/027; H04W 4/029; H04W 12/06; H04W 12/04; H04W 12/50; H04W 12/63; H04W 84/12; G07C 2209/08; G07C 9/00571; G07C 9/00896; G07C 9/21; G07C 2009/00769; G07C 2009/0092; G07C 9/00182; G07C 9/00912; G07C 9/33; G07C 2009/00388; G07C 2009/00539; G07C 9/00174; G07C 9/00309; G07C 9/32; B64U 10/13; B64U 2201/20; B64U 2101/30; B64U 2101/64; B64U 2201/104; B64U 2101/60; B64U 2101/66; B64U 2201/10; B64U 70/90; A47G 2029/149; A47G 29/141; A47G 2029/146; A47G 2029/147; A47G 29/122; A47G 29/30; A47G 2029/1226; A47G 2029/143; A47G 2029/145; A47G 29/1201; A47G 29/1218; A47G 29/1225; A47G 29/124; A47G 29/14; G06T 1/0021; G07F 9/002; G07F 9/026; G07F 11/02; G07F 17/12; G07F 17/13; G07F 9/006; G07F 9/009; G07F 9/001; H04N 21/2347; H04N 21/235; H04N 21/2362; H04N 21/2541; H04N 21/2543; H04N 21/2547; H04N 21/25875; H04N 21/4143; H04N 21/4345; H04N 21/435; H04N 21/4405; H04N 21/44204; H04N 21/443; H04N 21/4627; H04N 21/4753; H04N 21/6581; H04N 21/8166; H04N 21/835; H04N 21/83555; H04N 21/8358; H04N 7/162; H04N 7/17309; A63H 27/12; B64D 1/02; B64D 1/12; G01C 21/20; G01S 19/42; Y10T 70/5155; G06K 17/0022; G06K 2007/10524; G06K 7/10881; G06K 7/1413; G06K 7/1426; B65G 51/06; B65G 67/20; B07C 3/00
See application file for complete search history.

(56) References Cited

U.S. PATENT DOCUMENTS

| | | | |
|---|---|---|---|
| 11,606,686 B2 | 3/2023 | Alameh et al. | |
| 2002/0077929 A1 | 6/2002 | Knorr et al. | |
| 2007/0078967 A1* | 4/2007 | O'Flaherty | G07C 1/20 |
| | | | 709/224 |
| 2015/0081587 A1* | 3/2015 | Gillen | G06Q 10/08355 |
| | | | 705/338 |
| 2017/0330145 A1* | 11/2017 | Studnicka | G07C 9/00896 |
| 2018/0165751 A1* | 6/2018 | Chiyo | G06Q 10/0833 |
| 2021/0097486 A1* | 4/2021 | Boccuccia | G06Q 10/08 |
| 2021/0182780 A1* | 6/2021 | Morris | G07C 9/00912 |
| 2023/0206168 A1* | 6/2023 | Suzuki | H04W 4/025 |
| 2024/0112126 A1* | 4/2024 | McKay | G06Q 10/0833 |

OTHER PUBLICATIONS

"How to fetch visitor report on ADDA", ADDA Gatekeeper Help; Available online at https://support.adda.io/portal/en/kb/articles/how-to-fetch-visitor-report-on-adda; Unknown Exact Publication Date but believed to be prior to filing of present application.

"Welcoming Auto Approvals Feature on ADDA App", Published May 5, 2022; Available Online at https://adda.io/blog/2022/05/welcoming-zero-wait-approval-feature-on-adda-app/.

Liu, Gia , "Amazon Key: Everything you need to know", Published Mar. 6, 2018 online at https://www.digitaltrends.com/home/what-is-amazon-key/.

* cited by examiner

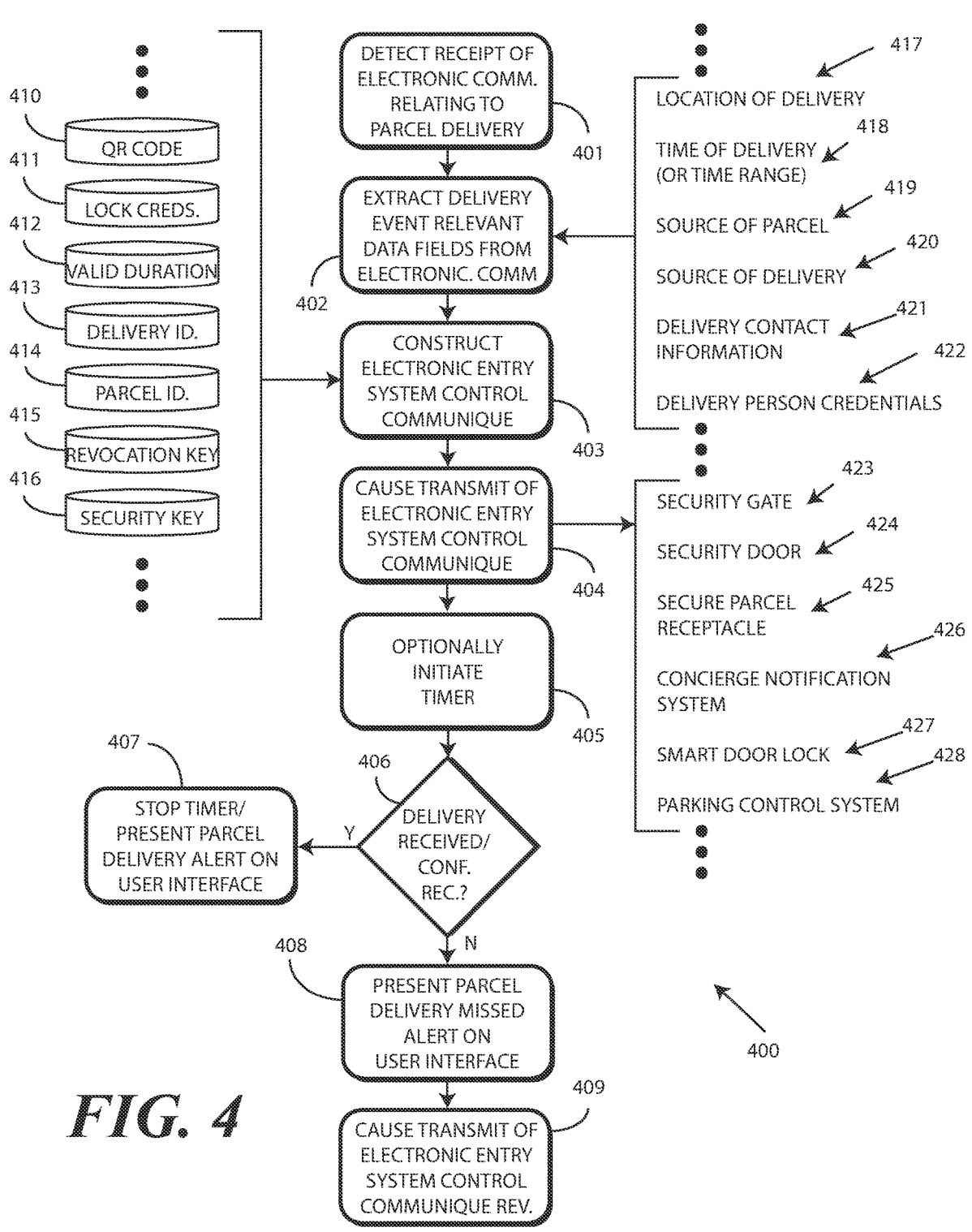

410

411 QR CODE

412 LOCK CREDS.

413 VALID DURATION

414 DELIVERY ID.

415 PARCEL ID.

416 REVOCATION KEY

SECURITY KEY

DETECT RECEIPT OF
ELECTRONIC COMM.
RELATING TO
PARCEL DELIVERY
401

EXTRACT DELIVERY
EVENT RELEVANT
DATA FIELDS FROM
ELECTRONIC. COMM
402

CONSTRUCT
ELECTRONIC ENTRY
SYSTEM CONTROL
COMMUNIQUE
403

CAUSE TRANSMIT OF
ELECTRONIC ENTRY
SYSTEM CONTROL
COMMUNIQUE
404

OPTIONALLY
INITIATE
TIMER
405

406 DELIVERY
RECEIVED/
CONF.
REC.?

407 STOP TIMER/
PRESENT PARCEL
DELIVERY ALERT ON
USER INTERFACE
Y

408 PRESENT PARCEL
DELIVERY MISSED
ALERT ON
USER INTERFACE
N

409 CAUSE TRANSMIT OF
ELECTRONIC ENTRY
SYSTEM CONTROL
COMMUNIQUE REV.

LOCATION OF DELIVERY 417

TIME OF DELIVERY 418
(OR TIME RANGE)

SOURCE OF PARCEL 419

SOURCE OF DELIVERY 420

DELIVERY CONTACT 421
INFORMATION

DELIVERY PERSON CREDENTIALS 422

SECURITY GATE 423

SECURITY DOOR 424

SECURE PARCEL 425
RECEPTACLE

CONCIERGE NOTIFICATION 426
SYSTEM

SMART DOOR LOCK 427

PARKING CONTROL SYSTEM 428

-- PRIOR ART --

ELECTRONIC DEVICES AND CORRESPONDING METHODS FOR GENERATING AND TRANSMITTING ELECTRONIC ENTRY SYSTEM CONTROL COMMUNIQUES

BACKGROUND

Technical Field

This disclosure relates generally to electronic devices, and more particularly to electronic devices having wired or wireless communication devices.

Background Art

Portable electronic devices, such as smartphones and tablet computers, are now the primary electronic tools with which people communicate, engage in commerce, maintain calendars and itineraries, monitor health, capture images and video, and surf the Internet. In many instances, a person is more likely to carry a smartphone than a watch or wallet. Indeed, entire electronic commerce marketplaces have evolved that allow a person to quickly and conveniently order goods that can be delivered within a day or less. As more and more people begin to use electronic devices to order goods, it can be challenging to coordinate each delivery. It would be advantageous to have improved devices and systems to prevent situations such as this from occurring.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

FIG. 4 illustrates yet another explanatory method in accordance with one or more embodiments of the disclosure.

FIGS. 6-9 illustrate explanatory user interface alert presentations for an electronic device configured in accordance with one or more embodiments of the disclosure.

Figure 1:
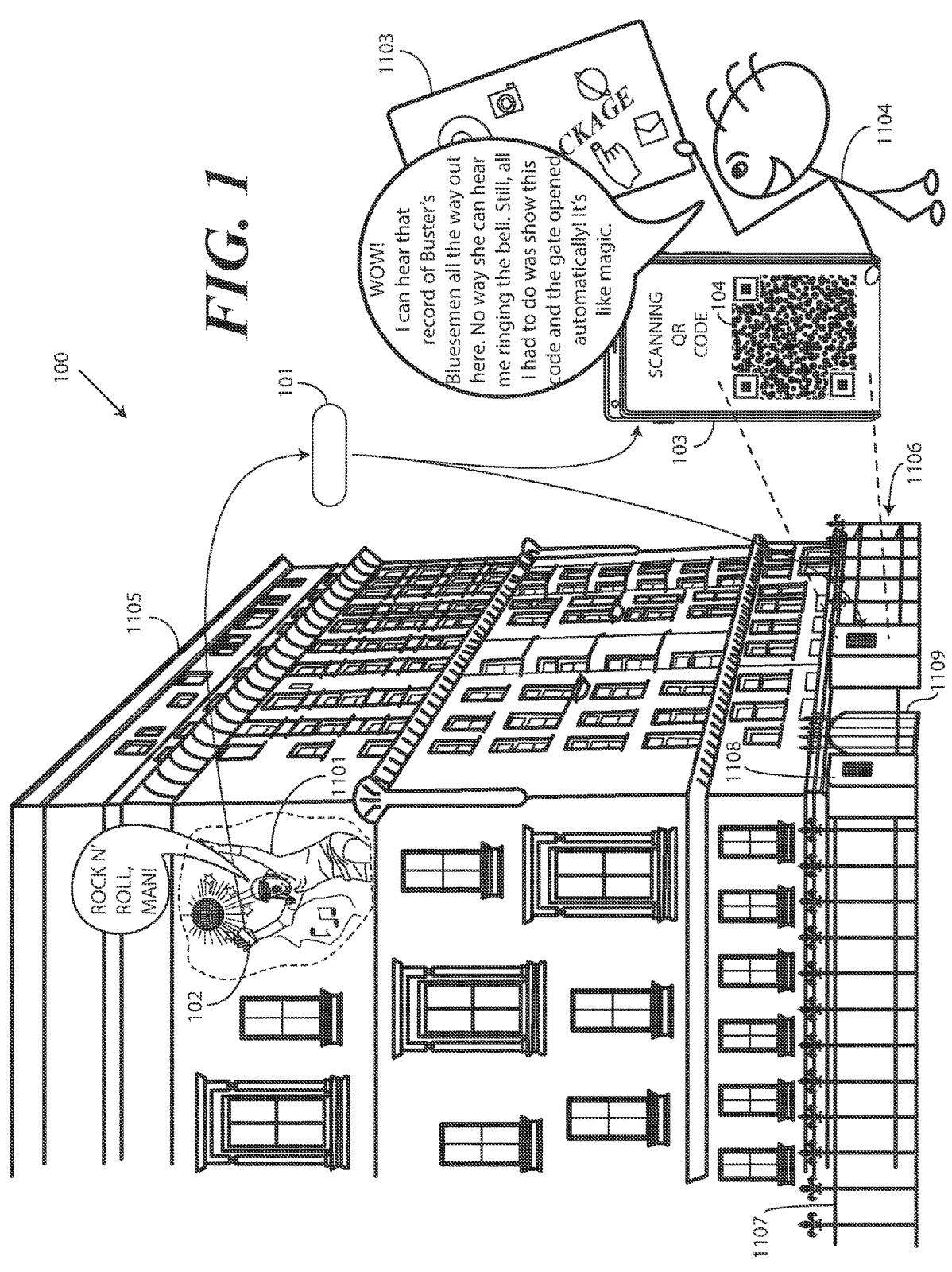
FIG. 1 illustrates one explanatory system in operation in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to extract one or more delivery event relevant data fields from an electronic communication relating to a parcel delivery, constructing an electronic entry system control communique as a function of the one or more delivery event relevant data fields extracted from the electronic communication relating to a parcel delivery, and causing a communication device to transmit the electronic entry system control communique to a remote electronic device. Any process descriptions or blocks in flow charts should be understood as representing modules, segments, or portions of code which include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by allowing the electronic device to control the operation of a remote electronic device, optionally for a predefined duration, thereby improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of extracting, from an electronic communication relating to a parcel delivery received by a communication device of an electronic device, at least a parcel delivery time and a parcel delivery location and causing the communication device to transmit an electronic entry system control communique allowing entry through an entry control system situated at the parcel delivery location at the parcel delivery time to the entry control system as described herein. The non-processor circuits may include, but are not limited to, a radio receiver, a radio transmitter, signal drivers, clock circuits, power source circuits, and user input devices.

As such, these functions may be interpreted as steps of a method to receiving an electronic communication relating to a parcel delivery, extracting one or more delivery event relevant data fields from the electronic communication relating to the parcel delivery, determining whether a location of the electronic device corresponds to a parcel delivery location extracted from the one or more delivery event relevant data fields, and causing a communication device of the electronic device to transmit an electronic entry system control communique to a remote electronic device. Alternatively, some or all functions could be implemented by a state machine that has no stored program instructions, or in one or more application specific integrated circuits (ASICs), in which each function or some combinations of certain of the functions are implemented as custom logic.

Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Smartphones and tablet computers have become so powerful that many users of such devices today eschew laptop and desktop computers and instead perform all their computing operations using only a smartphone or tablet. One of the most popular activities facilitated by such electronic devices involves electronic commerce. Many electronic commerce vendors now allow people to purchase anything they want—from fashion to appliances or from home decor to books—at great prices with very quick delivery. In many instances, a person can use a smartphone or laptop computer to engage an electronic commerce website or application portal to purchase goods and have those goods delivered the next day or, in some cases, even the same day.

While incredibly convenient, such marketplace services can generate issues when the goods are delivered. Illustrating by example, when a person lives within a gated community, condominium tower, apartment complex, or other residential area where there is an entry control system, problems can arise when parcels are delivered, and no one is present to accept them. Even worse is when parcels are delivered and no one is present to even allow the parcel delivery person through the entry control system associated with the gated community, condominium tower, apartment complex, or other residential area. Even when such residential areas are staffed by concierges or doormen, the problem still remains as these employees still have to occasionally leave their posts to take bio-breaks, eat meals, or perform other duties. If a parcel is delivered and no one is there to receive it, it may be returned, thereby frustrating not only the purchaser, but the financial organizations facilitating the electronic commerce transaction.

Even when someone is present to accept a parcel, problems can still arise. Illustrating by example, the arrival of parcels creates interruptions in that every parcel arriving requires a person to be interrupted to approve the delivery. Moreover, if a person attempts to provide a general "blanket" approval for all deliveries, this can create a security risk in that nefarious actors can attempt to exploit such approvals via the delivery of fake parcels.

Figure 11:
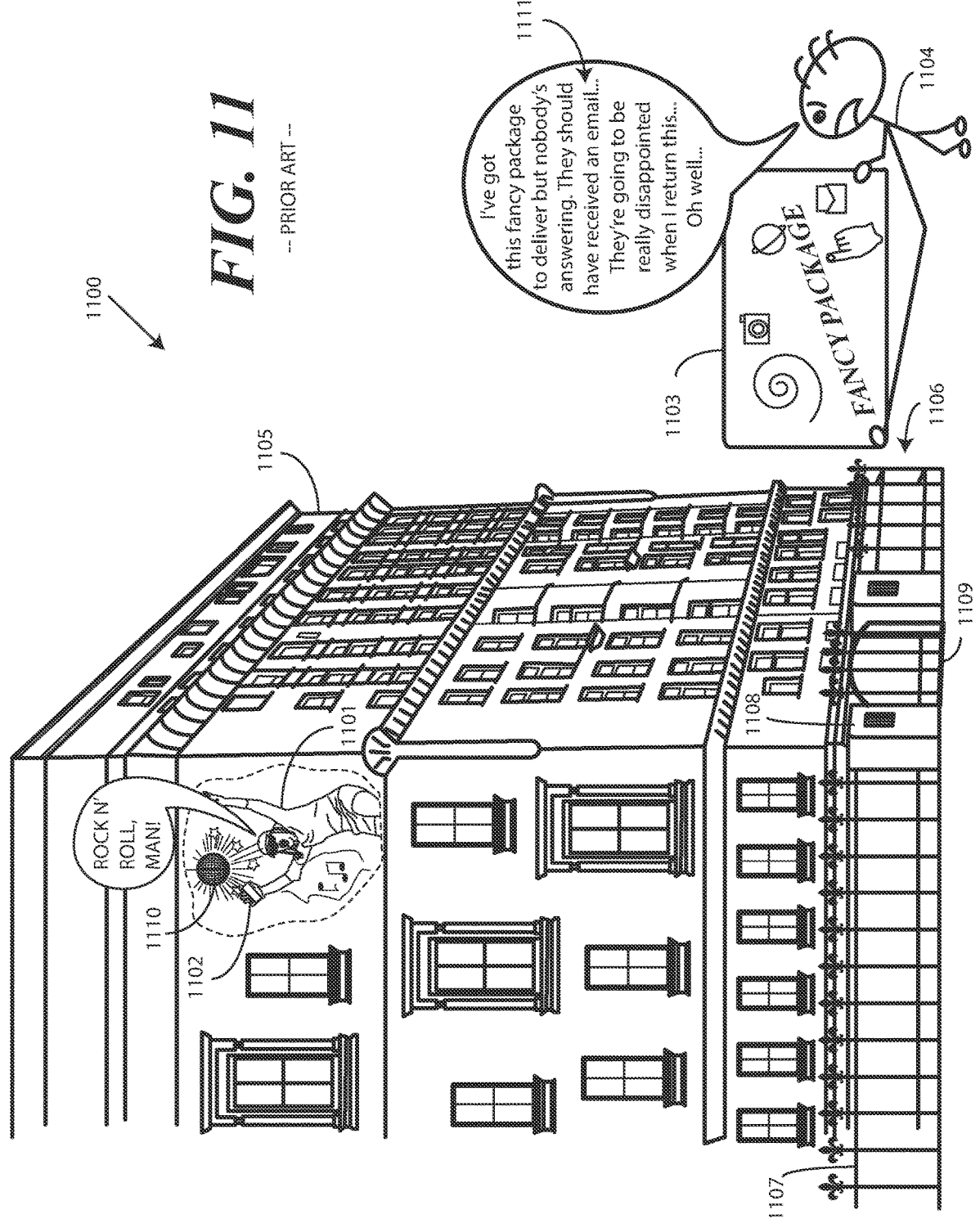
FIG. 11 illustrates a prior art system in accordance with one or more embodiments of the disclosure.

Turning first to FIG. 11, illustrated therein is one prior art system 1100. In this example, a person 1101 has used a smartphone 1102 to engage an electronic commerce portal to order a very fancy package 1103. A delivery person 1104 has arrived at the person's fancy condominium tower 1105, which has an entry control system 1106 that includes a fence 1107, concrete pillars 1108, and an electronically controlled gate 1109.

Unfortunately, the person 1101 is so excited about the arrival of her very fancy package 1103 that she has used her home hi-fi system 1110 to play some music. Turning it up, in the words of Nigel Tufnel in the cinematographic classic "This is Spinal Tap," "to eleven," the person 1101 is dancing to the soulful sounds of Buster and his Bluesmen as they play their classic "Mac's Boogie Woogie," much to the chagrin of her neighbors. Screaming, "Rock and Roll, Man!" while dancing to the intoxicating rhythm of the Bluesmen, there is absolutely no way the person 1101 can hear her smartphone 1102 or any other type of notification that may be generated by the delivery person 1104.

As shown, the delivery person 1104 laments that while he has the very fancy package 1103 ready to deliver to the person 1101, she is not answering her smartphone 1102. Moreover, the delivery person 1104 notes that the person 1101 should have received an email alert 1111 as well. Regardless, the delivery person 1104 is unable to gain access to the fancy condominium tower 1105 because he cannot get through the electronically controlled gate 1109. Downtrodden and forlorn, the delivery person 1104 has no choice but to return the very fancy package 1103 to the seller due to the person's distraction. When the person 1101 finds out that she missed the delivery of her very fancy package 1103, not even the genius of Buster or his Bluesmen will be able to cheer her up.

Alas, this situation is all too common with prior art electronic commerce transactions. When a person misses a delivery the resulting return of a parcel is painful for each of the person, who does not get the joy of unboxing their parcel, the business selling the parcel, who must restock the item and reverse the purchase transaction, and the delivery person, who made a wholly unnecessary trip in an attempt to deliver the parcel. For people who rely upon such deliveries for most things, as many people do after the SARS-Cov-19 pandemic, such situations can result in a person missing multiple parcel deliveries every single day.

Advantageously, embodiments of the disclosure provide a solution to this problem. Embodiments of the disclosure contemplate that when people use electronic devices to engage in electronic commerce transactions triggering the delivery of parcels, such people generally receive many electronic communications detailing when the parcel is being processed, when the parcel ships, when the parcel is expected to arrive, and so forth. Such electronic communications are received by the communication device of an electronic device in the form of electronic mail, short message service text messages, multi-media messages, or application-specific communications. As used herein, these electronic communications describing statuses or other details concerning a parcel delivery are referred to as "electronic communications relating to a parcel delivery."

Embodiments of the disclosure take advantage of these electronic communications relating to a parcel delivery by detecting their receipt and the extracting, by one or more processors of the electronic device, one or more delivery event relevant data fields from received electronic communications relating to the parcel delivery. These delivery event relevant data fields can indicate from where the parcel is being shipped, when the parcel is being delivered, what time the parcel is being delivered, who is delivering the parcel, and so forth.

In one or more embodiments, once the one or more delivery event relevant data fields are extracted from the electronic communication relating to the parcel delivery, one or more processors of the electronic device construct an electronic entry system control communique as a function of the one or more delivery event relevant data fields extracted from the electronic communication relating to the parcel delivery. The one or more processors then cause the communication device to transmit the electronic entry system control communique to a remote electronic device, one example of which is an electronically controlled entry control system. Thus, when the parcel delivery person arrives, the delivery is pre-approved and return to seller is not required.

In one or more embodiments, the electronic entry system control communique is valid for only a duration defined by the one or more delivery event relevant data fields extracted from the electronic communication relating to the parcel delivery. Illustrating by example, if the electronic communication relating to the parcel delivery indicates that a particular parcel is to be delivered between 7:31 AM and 3:00 PM today, in one or more embodiments the electronic entry system control communique is valid only for that duration window.

In one or more embodiments, the one or more processors can cause a timer to start when the duration defined by the one or more delivery event relevant data fields extracted from the electronic communication relating to the parcel delivery commences. When the timer expires, the one or more processors can cause the presentation of a delivery missed alert on a user interface of the electronic device. In other embodiments, the one or more can cause the communication device of the electronic device to transmit an electronic entry system control revocation communique to the remote electronic device.

Other operations can be performed as well. In one or more embodiments, the one or more processors of the electronic device detect, from other signals received from the communication device, receipt by the communication device of another electronic communication confirming the parcel delivery. When this occurs, the one or more processors can stop the timer. When the electronic communication confirming the parcel delivery is received prior to the expiration of the timer, the one or more processors can cause a parcel delivery alert to be presented on a user interface of the electronic device.

The electronic entry system control communique can take a variety of forms. In one or more embodiments, the electronic entry system control communique contains executable code allowing an electronically controllable electronic entry system to be controlled. Illustrating by example, if the electronically controllable electronic entry system comprises an electronically unlockable door or gate, in one or more embodiments the electronic entry system control communique can control the electronically unlockable door or gate to allow a parcel delivery person access to a delivery location.

In some embodiments, the electronic entry system control communique comprises a verification key that must be presented by the parcel delivery person prior to the electronically unlockable door or gate being opened. Illustrating by example, in one or more embodiments the electronic entry system control communique comprises a quick response (QR) code that is transmitted to an electronic device belonging to the parcel delivery person. When the parcel delivery person arrives, they present this QR code. To the electronically controllable electronic entry system to cause the same to allow access to the parcel delivery person.

Advantageously, embodiments of the disclosure extract delivery information from received messages. Examples of such delivery information include from where the delivery is coming, where the delivery is arriving, and when the delivery is arriving. Embodiments of the disclosure then interact with an automatic premises entry allowance device to set up an automatic approval of the parcel delivery person for the extracted place and time. In one or more embodiments, if the person receiving the parcel leaves the parcel delivery location after the automatic approval is set, or alternatively was not in the parcel delivery location when the automatic approval was enabled, the one or more processors of the electronic device alert the person about an impending delivery and provide the person with options to cancel the automatic approval. Other advantages will be described below. Still others will be obvious to those of ordinary skill in the art having the benefit of this disclosure.

Turning now to FIG. 1, illustrated therein is one explanatory system 100 configured in accordance with one or more embodiments of the disclosure. The players of this system 100 are again those from FIG. 11, namely, the person 1101 living in the fancy condominium tower 1105 and the parcel delivery person 1104. However, in this system 100, in contrast to the prior art system (1100) of FIG. 11, the person 1101 is using an electronic device 102 configured in accordance with one or more embodiments of the disclosure. In one or more embodiments, this electronic device 102 comprises a user interface, a communication device, and one or more processors operable with the user interface and the communication device.

As before, the person 1101 has used her electronic device 102 to engage an electronic commerce portal to order a very fancy package 1103. In response to ordering the very fancy package 1103, the communication device of the electronic device 102 has received at least one electronic communication relating to the parcel delivery. In this illustrative example, these electronic communications have included electronic mail communications confirming the order and confirming that the very fancy package 1103 is out for delivery. In the latter, the electronic communication was a text message indicating (1) that the very fancy package 1103 was out for delivery, (2) that the very fancy package 1103 would be delivered between 7:31 AM and 3:00 PM today, (3) that the very fancy package 1103 would be delivered by the delivery person 1104, and (4) a reminder that the person

1101 should be available during this time to avoid the very fancy package 1103 from being returned to the sender.

In one or more embodiments, the one or more processors of the electronic device 102 then extracted, from the electronic communication relating to the parcel delivery received by the communication device, at least a parcel delivery time and a parcel delivery location. Additionally, the one or more processors of the electronic device 102 caused the communication device to transmit an electronic entry system control communique 101 allowing entry through the entry control system 1106 situated at the parcel delivery location, which is the electronically controlled gate 1109 situated at the fancy condominium tower 1105 in this example. In this example, the communication device transmits the electronic entry system control communique 101 to the entry control system 1106 at the parcel delivery time to control the entry control system 1106.

In this illustrative embodiment, the electronic entry system control communique 101 was also delivered to the electronic device 103 of the delivery person 1104. As shown in this illustrative example, the electronic entry system control communique 101 comprises a QR code 104. Accordingly, when the delivery person 1104 arrives at the person's fancy condominium tower 1105, which has an entry control system 1106 that includes a fence 1107, concrete pillars 1108, and an electronically controlled gate 1109, despite the fact that the person is still jamming to Buster and his Bluesmen turned up to eleven, the delivery person 1104 is able to present the QR code 104 to an optical reader operable with the electronically controlled gate 1109. This causes the electronically controlled gate 1109 to open, thereby allowing the delivery person 1104 to enter the fancy condominium tower 1105 and deliver the very fancy package 1103. In effect, the fact that the one or more processors of the electronic device 102 generated the electronic entry system control communique 101 from the one or more delivery event relevant data fields extracted from the electronic communication relating to the parcel delivery defining the parcel delivery time and parcel delivery location allowed the electronic device 102 to automatically control the electronically controlled gate 1109 to deliver the very fancy package 1103 without the person 1101 being interrupted from her musical experience.

Thus, as shown in FIG. 1, one or more processors of the electronic device 102 are configured to extract, from an electronic communication relating to a parcel delivery received by the communication device of the electronic device 102, at least a parcel delivery time and a parcel delivery location. The one or more processors then cause the communication device to transmit an electronic entry system control communique 101 allowing entry through an entry control system 1106 situated at the parcel delivery location at the parcel delivery time to the entry control system 1106. This allows the delivery person 1104 to conveniently deliver the very fancy package 1103 without needing additional assistance and without disrupting the person's musical enjoyment.

As noted above, in one or more embodiments the electronic entry system control communique 101 is valid only for a predefined duration spanning the parcel delivery time. In one or more embodiments, the one or more processors of the electronic device 102 are configured to revoke the electronic entry system control communique 101 upon expiration of the predefined duration. This can be beneficial for security reasons. Thus, if the delivery person 1104 had been late, the QR code 104 would not have been effective to control the electronically controlled gate 1109.

In one or more embodiments, the one or more processors of the electronic device 102 are only configured to cause the communication device to transmit the electronic entry system control communique 101 allowing entry through the entry control system 1106 situated at the parcel delivery location at the parcel delivery time to the entry control system 1106 when the smartphone 1102 is situated at the parcel delivery location, e.g., when the person 1101 is in the fancy condominium building 1105. In one or more embodiments, if the electronic device 102 is away from the parcel delivery location, i.e., is situated more than a predetermine distance from the parcel delivery location when the electronic communication relating to the parcel delivery is received by the communication device, the one or more processors are configured to present a parcel delivery alert on a user interface of the electronic device 102. In one or more embodiments, the parcel delivery alert provides options to reschedule or cancel delivery of the very fancy package 1103.

Figure 2:
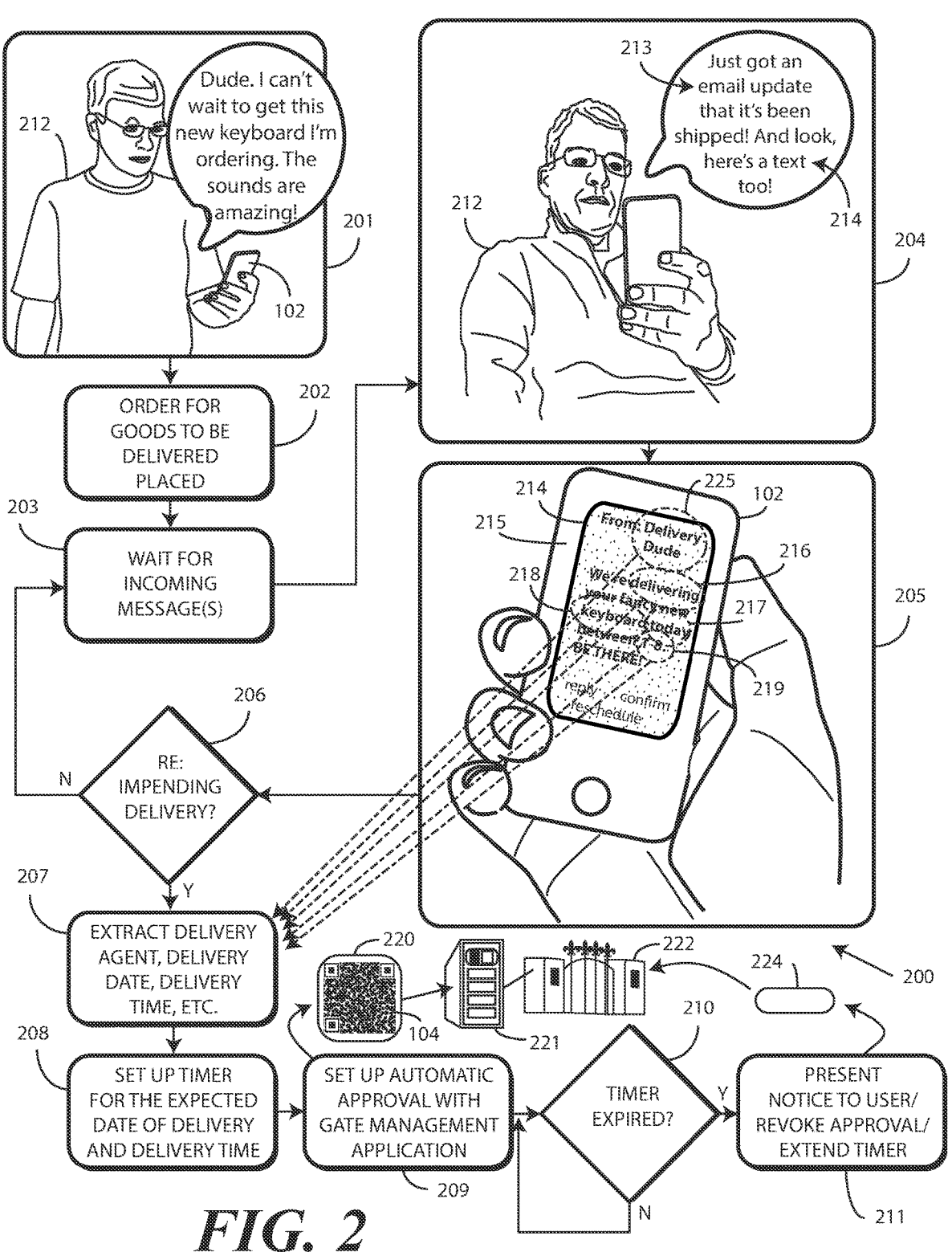
FIG. 2 illustrates one explanatory method in accordance with one or more embodiments of the disclosure.

Turning now to FIG. 2, illustrated therein is one explanatory method 200 in accordance with one or more embodiments of the disclosure. Beginning at step 201, a user 212 is using an electronic device 102 configured in accordance with one or more embodiments of the disclosure to engage with an electronic shopping interactive computing environment operating on one or more processors of the electronic device 102. In this illustrative example, the user 212 is using the electronic device 102 to engage with the electronic shopping interactive computing environment to send an electronic data structure ordering an electronic keyboard. As shown at step 201, the user 212 is super exciting because he is blown away with all the cool sounds he will be able to play using the new keyboard. At step 202 the electronic data structure comprising the order details is transmitted to a remote electronic device operated by an electronic commerce operator selling really cool keyboards.

At step 203, one or more processors of the electronic device 102 wait for a communication device of the electronic device 102 to receive one or more electronic communications relating to a parcel delivery. At step 204, such an electronic communication relating to the parcel delivery has been received. In particular, the user 212 notes that an email 213 and a text message 214 indicating that the keyboard has shipped have both been received.

The text message 214 is shown on a user interface 215 of the electronic device 102 at step 205. Thus, as shown at step 205, this method 200 includes one or more processors of the electronic device 102 detecting, from signals received from a communication device of the electronic device 102, receipt by the communication device of an electronic communication relating to the parcel delivery, which is represented at step 205 by the text message 214.

At decision 206, the one or more processors of the electronic device 102 determine whether the electronic communication relating to the parcel delivery indicates that a delivery is forthcoming. Embodiments of the disclosure contemplate that the communication device of the electronic device 102 can receive various types of electronic communication relating to the parcel delivery throughout the delivery process. One may confirm receipt of the data structure defining the order that was transmitted at step 202. Another may indicate the fancy keyboard is on backorder. Another might indicate that the order is being processed. Still another may indicate that the fancy keyboard is being shipped, and so forth.

In this case, the text message 214 indicates that delivery is imminent. Thus, decision 206 causes the method to move to step 207. Had the electronic communication relating to the parcel delivery been another type of communication, the method would have returned to step 203.

At step 207, one or more processors of the electronic device 102 extract one or more delivery event relevant data fields 225,216,217,218,219 from the electronic communication relating to the parcel delivery. In this illustrative example, a first delivery event relevant data field 225 indicates whom will be delivering the fancy keyboard. A second delivery event relevant data field 216 indicates that a delivery is indeed imminent. A third delivery event relevant data field 217 indicates what will be in the parcel, namely, the super fancy keyboard in this illustrative example. A fifth delivery event relevant data field 218 indicates a duration during which the keyboard will be delivered. These delivery event relevant data fields are illustrative only, as others will be obvious to those of ordinary skill in the art having the benefit of this disclosure.

At optional step 208, one or more processors of the electronic device 102 actuate a timer and configure it to start running when the duration during which the parcel will be delivered. In one or more embodiments, this step 208 comprises configuring the timer to expire when the duration during which the parcel will be delivered, extracted from the electronic communication relating to the parcel delivery, expires.

At step 209, the one or more processors of the electronic device 102 construct an electronic entry system control communique 220. In one or more embodiments, step 209 comprises constructing the electronic entry system control communique 220 as a function of the one or more delivery event relevant data fields 225,216,217,218,219 extracted from the electronic communication relating to the parcel delivery. Illustrating by example, the electronic entry system control communique 220 may only be valid for a duration defined by delivery event relevant data field 219 on the date defined by delivery event relevant data field 217. In some embodiments, the electronic entry system control communique 220 may only be valid for the delivery person identified by delivery event relevant data field 225, and so forth. In this illustrative example, the electronic entry system control communique 220 comprises a QR code 104.

In one or more embodiments, step 209 also comprises the one or more processors of the electronic device 102 causing the communication device to transmit the electronic entry system control communique 220 to a remote electronic device 221. In this example, the remote electronic device 221 comprises an automatic premises entry allowance device configured as a computer operable to control an automatic gate 222. Other examples of automatic premises entry allowance devices will be obvious to those of ordinary skill in the art having the benefit of this disclosure. For instance, the automatic premises entry allowance device could be an electronically controllable door, an electronically controllable parcel delivery receptacle, an electronically controllable mail chute, or something similar.

In one or more embodiments, step 209 also comprises causing, by the one or more processors of the electronic device, the timer configured at step 208 to start when the duration defined by the delivery event relevant data field 219 extracted from the electronic communication relating to the parcel delivery commences. Decision 210 then determines whether the timer expires.

Where it does, in one or more embodiments step 211 comprises the one or more processors of the electronic device 102 causing the presentation of a delivery missed alert on the user interface 215 of the electronic device. One example of such a delivery missed alert will be shown below with reference to FIG. 7. Others will be obvious to those of ordinary skill in the art having the benefit of this disclosure.

In other embodiments, step 211 can comprise, in response to decision 210 determining that the timer has expired, causing the communication device to transmit an electronic entry system control revocation communique 224 to the remote electronic device 221 revoking the electronic entry system control communique 220. In still other embodiments, step 211 can comprise presenting a user actuation target on the user interface of the electronic device 102 allowing the user 212 to extend the timer. Other actions that can be performed at step 211 will be obvious to those of ordinary skill in the art having the benefit of this disclosure.

Embodiments of the disclosure contemplate that the fancy keyboard may get delivered in accordance with the electronic communication relating to the parcel delivery. Indeed, in many cases this is the most likely outcome. Other operations, examples of which will be described in more detail with reference to FIG. 4 below, can occur when this happens. Illustrating by example, in one or more embodiments the one or more processors of the electronic device 102 detect, from other signals received from the communication device of the electronic device 102, receipt by the communication device of another electronic communication confirming parcel delivery prior to the expiration of the timer. In one or more embodiments, when this occurs the one or more processors can cause the presentation of a parcel delivery alert on a user interface of the electronic device. One such example of such a parcel delivery alert will be illustrated and described below with reference to FIG. 6. Others will be obvious to those of ordinary skill in the art having the benefit of this disclosure.

In still other embodiments, the one or more processors of the electronic device 102 can detect, from other signals received by the communication device of the electronic device 102, receipt by the communication device of another electronic communication confirming the parcel delivery prior to expiration of the timer. When this occurs, the one or more processors can cause the timer to stop. Of course, this stoppage of the timer can be performed in conjunction with the presentation of a parcel delivery alert on a user interface of the electronic device. Other operations that can be performed when the parcel is delivered in accordance with the one or more delivery event relevant data fields extracted from the electronic communication relating to the parcel delivery will be obvious to those of ordinary skill in the art having the benefit of this disclosure.

Figure 3:
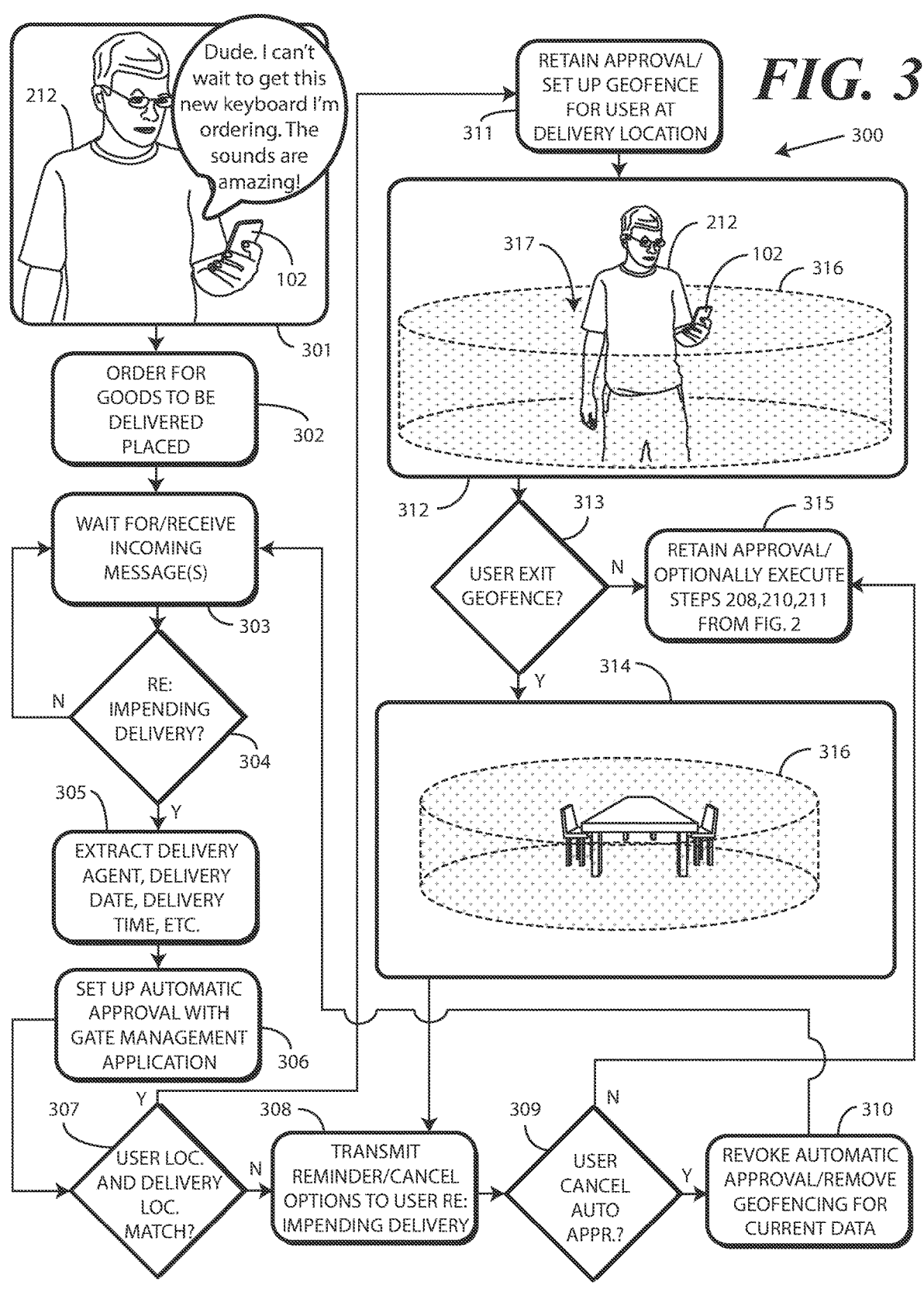
FIG. 3 illustrates another explanatory method in accordance with one or more embodiments of the disclosure.

Embodiments of the disclosure contemplate that some users may want the automatic parcel delivery entry access offered by embodiments of the disclosure to only be available when they are present. Illustrating by example, using the example from FIG. 1 above, the person (1101) may only wish for the electronic entry system control communique (101) to allow the delivery person (1104) to enter through the electronically controllable gate (1109) when the person (1101) is present in the fancy condominium building (1105). To satisfy such users, some embodiments of the disclosure first determine whether a parcel delivery recipient is situated at the parcel delivery location when one or more of the time when the electronic entry system control communique is generated, the parcel delivery time, or the time when the electronic entry system control communique is effective. If the user is not in such a location, various actions can be taken, including precluding the electronic entry system control communique from being generated, providing options for canceling or rescheduling the parcel delivery, or allowing the person to override such actions and maintain the electronic entry system control communique in effect. Turning now to FIG. 3, illustrated therein is one such method 300.

The method 300 of FIG. 3 begins much in the same way that the method (200) of FIG. 2 began. It should be noted that the operations occurring in the method 300 of FIG. 3 can be combined with the operations occurring in the method (200) of FIG. 2.

Beginning at step 301, our user 212 is again using an electronic device 102 configured in accordance with one or more embodiments of the disclosure to engage with an electronic shopping interactive computing environment operating on one or more processors of the electronic device 102. Once again, the user 212 is using the electronic device 102 to engage with the electronic shopping interactive computing environment to send an electronic data structure ordering an electronic keyboard.

At step 302 the electronic data structure comprising the order details is transmitted to a remote electronic device operated by an electronic commerce operator selling this really cool keyboard. At step 303, one or more processors of the electronic device 102 wait for a communication device of the electronic device 102 to receive one or more electronic communications relating to a parcel delivery. Decision 304 determines whether the electronic communication relating to the parcel delivery indicates that a delivery is forthcoming. Where it is, the method 300 moves to step 305. Otherwise, the method 300 returns to step 303.

At step 305, one or more processors of the electronic device 102 extract one or more delivery event relevant data fields (225,216,217,218,219) from the electronic communication relating to the parcel delivery. In one or more embodiments, these one or more delivery event relevant data fields (225,216,217,218,219) include a parcel delivery location 317.

At step 306, the one or more processors of the electronic device 102 construct an electronic entry system control communique (220). In one or more embodiments, step 306 comprises constructing the electronic entry system control communique (220) as a function of the one or more delivery event relevant data fields (225,216,217,218,219) extracted from the electronic communication relating to the parcel delivery at step 305, as previously described.

As noted above, it should be clear that functions may be executed out of order from that shown or discussed, including substantially concurrently or in reverse order, depending on the functionality involved. Accordingly, in one or more embodiments step 306 can occur after decision 307, which determines whether a location of the electronic device 102 and the parcel delivery location extracted from the one or more delivery event relevant data fields (225,216,217,218, 219) are the same. In one or more embodiments, when this is the case and the location of the electronic device 102 corresponds to the parcel delivery location extracted from the one or more delivery event relevant data fields (225, 216,217,218,219), step 306 can then comprise constructing the electronic entry system control communique as a function of the one or more delivery event relevant data fields (225,216,217,218,219) extracted from the electronic communication relating to the parcel delivery and causing the communication device of the electronic device 102 to transmit the electronic entry system control communique to a remote electronic device. Regardless of whether step 306 is performed before or after decision 307, in one or more embodiments the electronic entry system control communique is valid only for a predefined duration, one example of which is extracted from the one or more delivery event relevant data fields (225,216,217,218,219) as noted above.

Decision 307 determines, using one or more sensors of the electronic device, whether a location of the electronic device 102 corresponds to a parcel delivery location 317 extracted from the one or more delivery event relevant data fields (225,216,217,218,219) extracted from the electronic communication relating to the parcel delivery at step 305. Where it does, the method 300 moves to step 311. Otherwise, the method 300 moves to step 308.

At step 311, in one or more embodiments the method 300 establishes, by the one or more processors, a geofence 316 about the parcel delivery location 317. In one or more embodiments, a geofence manager, which can be operable with one or more processors in the electronic device 102, configured as a component of the one or more processors, or configured as one or more executable code modules operating on the one or more processors, establish the geofence 316 about the parcel delivery location 317, or alternatively about the electronic device itself. In one or more embodiments, the geofence 316 defines a boundary about the parcel delivery location 317 or electronic device fixed by one or more geographic coordinates. For example, the geofence 316 may be defined by a radius of, say, one hundred feet around the parcel delivery location 317 in one embodiment. In one or more embodiments, the predefined radius of the geofence 316 is user-definable using a menu of the electronic device.

In one or more embodiments, the geofence 316 defines a virtual geographic boundary about the parcel delivery location 317 that can be sensed, measured, and/or detected by one or more sensors of the electronic device 102. For example, if the parcel delivery location 317 has geographic coordinates X and Y, with the geofence 316 having a predefined radius, such as one hundred feet, the geofence 316 would define a virtual boundary configured as a circle about the parcel delivery location 317 with a diameter of two hundred feet within which the electronic entry system control communique (220) would be active so long as the electronic device 102 is within that radius. Outside of the geofence 316 the one or more processors of the electronic device 102 may operate the electronic device 102 in a different mode of operation. Thus, as shown at step 312, when the location of the electronic device 102 corresponds to the parcel delivery location extracted from the one or more delivery event relevant data fields (225,216,217,218, 219), in one or more embodiments the geofence manager or one or more processors of the electronic device 102 establish a geofence.

Decision 307 determines whether the user 212, or more particularly the electronic device 102, exits the geofences 316. Illustrating by example, as show at step 314, the user 212 has excited the geofence 316, taking the electronic device 102 with him. In one or more embodiments, when this occurs, the one or more processors of the electronic device 102 cause the presentation of an impending delivery alert on a user interface of the electronic device 102 at step 308. On example of such an impending delivery alert will be illustrated and described below with reference to FIG. 9. Others will be obvious to those of ordinary skill in the art having the benefit of this disclosure.

In one or more embodiments, the impending delivery alert comprises one or more user actuation targets that, when actuated, allow for various operations to be performed. Examples of such operations include causing a revocation of the electronic entry system control communique generated at step 306, terminating the geofence 316 established at step 311, or other operations. Decision 309 determines whether the one or more user actuation targets presented at step 308 have been actuated.

Where they are, step 310 can comprise causing a revocation of the electronic entry system control communique generated at step 306 in one or more embodiments. In other embodiments, actuation of the one or more user actuation target can cause the geofence 316 created around the parcel delivery location 317 to be terminated. Other operations that can be performed at step 310 will be obvious to those of ordinary skill in the art having the benefit of this disclosure.

Where the user 212 fails to actuate any of the user actuation targets presented at step 308, as determined by decision 309, or alternatively where the user 212 and electronic device 102 remain within the geofence established at step 311, as determined by decision 313, the parcel delivery can be allowed to continue. This can include performing steps (208,211) and decision (210) from FIG. 2 at step 315.

Illustrating by example, in one or more embodiments step 315 comprises one or more processors of the electronic device 102 actuating a timer and configuring the timer to start running when the duration during which the parcel will be delivered. Since the electronic entry system control communique has already been created and transmitted to a remote electronic device at step 306 step 315 can also determine whether the timer expires.

Where it does, in one or more embodiments step 315 comprises the one or more processors of the electronic device 102 causing the presentation of a delivery missed alert on the user interface of the electronic device 102. One example of such a delivery missed alert will be shown below with reference to FIG. 7. In other embodiments, step 315 can comprise, in response to determining that the timer has expired, causing the communication device to transmit an electronic entry system control revocation communique to the remote electronic device revoking the electronic entry system control communique. In still other embodiments, step 315 can allow a user to extend the timer. Of course, where not mutually exclusive these various operations can be performed in combination.

Returning now to decision 307, the operation of the method 300 when the location of the electronic device 102 and the parcel delivery location has now been fully examined. Attention will now be directed to situations where the location of the electronic device 102 and the parcel delivery location do not match.

When decision 307 determines that the location of the electronic device fails to correspond to the parcel delivery location extracted from the one or more delivery event relevant data fields (225,216,217,218,219), step 308 can comprise the one or more processors of the electronic device 102 presenting an impending delivery alert on a user interface of the electronic device. As noted above, one example of such an impending delivery alert is illustrated and described below with reference to FIG. 9. As also noted above, in one or more embodiments the impending delivery alert comprises one or more user actuation targets that, when actuated, perform various operations. Upon presenting such an impending delivery alert, decision 309 and step 310 can follow thereafter as previously described.

Turning now to FIG. 4, illustrated therein is another method 400 configured in accordance with one or more embodiments of the disclosure. Beginning at step 401, the method 400 detects, using one or more processors of an electronic device from signals received from a communication device of the electronic device, receipt by the communication device of an electronic communication relating to a parcel delivery. At step 402, the method 400 extracts, using the one or more processors, one or more delivery event relevant data fields from the electronic communication relating to the parcel delivery. The one or more delivery event relevant data fields can take different forms. Some examples of delivery event relevant data fields have already been described. Others are shown in FIG. 4.

In one or more embodiments, one of the delivery event relevant data fields comprises a parcel delivery location 417. In one or more embodiments, another of the delivery event relevant data fields comprises a parcel delivery time 418.

In some embodiments, a delivery event relevant data field can comprise source of the parcel 419, e.g., a store or manufacturer who is responsible for delivering the parcel in response to an order data structure transferred from an electronic shopping interactive computing environment. In many embodiments, another delivery event relevant data field comprises a source of the delivery 420. This delivery event relevant data field can comprise the name of a delivery person, the delivery person's identification number, a description of the delivery person, a description of the delivery person's vehicle, the delivery person's employer, and so forth.

In one or more embodiments, the delivery event relevant data fields include delivery contact information 421. This delivery event relevant data field can comprise the delivery person's telephone number, the delivery person's email address, the telephone number of the source of the parcel 419, an email address of the source of the parcel 419, an order number, or other identifying information. In still other embodiments, the delivery event relevant data fields can comprise delivery person credentials 422, examples of which include the delivery person's identification number, a tag number from the delivery person's vehicle, and so forth. It should be noted that these examples of delivery event relevant data fields are illustrative only, as numerous others will be obvious to those of ordinary skill in the art having the benefit of this disclosure. Moreover, the delivery event relevant data fields described with reference to FIG. 4 and above in this disclosure can be used in various combinations.

At step 403, the method 400 constructs, using one or more processors of the electronic device, an electronic entry system control communique. In one or more embodiments, the electronic entry system control communique is constructed as a function of the one or more delivery event relevant data fields extracted at step 402 from the electronic communication relating to the parcel delivery received at step 401.

The electronic entry system control communique constructed at step 403 comprises a data structure and optionally executable code that, when executed by an electronic device having a non-transient memory, causes the electronic device to perform operations such as granting access for delivery of a parcel. Illustrating by example, when the electronic entry system control communique is transmitted to a remote electronic device at step 404, and the remote electronic device comprises an automatic premises entry allowance device, the electronic entry system control communique can cause the automatic premises entry allowance device to allow a person carrying an authenticated electronic device to enter the automatic premises entry allowance device.

Illustrating by example, in one or more embodiments the electronic entry system control communique comprises a QR code 410. Accordingly, this QR code 410 can be scanned by the automatic premises entry allowance device to allow a person carrying an electronic device presenting the QR code 410 entry through the automatic premises entry allowance device.

In other embodiments, the electronic entry system control communique can comprise lock credentials 411. Thus, for example, when the electronic entry system control communique is transmitted to an automatic gate at step 404, the automatic gate can be unlocked when a delivery person carrying an authenticated electronic device or authenticated parcel is detected within a vicinity of the automatic gate.

As noted above, in most instances the electronic entry system control communique generated at step 403 will be valid only for a predefined duration 412. In one or more embodiments, this predefined duration 412 is defined by the one or more delivery event relevant data fields extracted at step 402 from the electronic communication relating to the parcel delivery detected and received at step 401.

The electronic entry system control communique can also include data extracted from the delivery event relevant data fields at step 402, examples of which are shown in FIG. 4 as delivery identifiers 413 such as parcel delivery location, parcel delivery time, parcel delivery person, parcel delivery service, and so forth. Another example of data that can be included in the electronic entry system control communique created at step 403 include parcel identifiers 414 such as what is inside the parcel, whether any money is owed for the parcel, when the parcel was ordered, the price of the item inside the parcel, and so forth. Other data structures that can be included with the electronic entry system control communique created at step 403 will be obvious to those of ordinary skill in the art having the benefit of this disclosure.

In one or more embodiments, the electronic entry system control communique comprises a revocation key 415 allowing the electronic entry system control communique to be revoked. Recall from above that one or more processors of the electronic device can be configured to revoke an electronic entry system control communique when a timer expires, delivery fails, the user requests the same by delivering user input to a user interface, the user leaves a geofence, or other reasons. The inclusion of the revocation key 415 facilitates the revocation of such an electronic entry system control communique.

In some embodiments, the electronic entry system control communique also includes a security key 416. Where the security key 416 is a secret key, this secret key can be shared with an automatic premises entry allowance device so that a parcel delivery person can authenticate their electronic device to the automatic premises entry allowance device receiving the electronic entry system control communique using a shared secret key. This inclusion of the security key 416 advantageously prevents random strangers from gaining access to the automatic premises entry allowance device.

At step 404, the method 400 causes, using a communication device, the communication device to transmit the electronic entry system control communique to a remote electronic device. The remote electronic device can take a variety of forms, some examples of which are shown in FIG. 4 for illustrative purposes. Others will be obvious to those of ordinary skill in the art having the benefit of this disclosure.

In one or more embodiments, the remote electronic device comprises a security gate 423, one example of which is an automatic gate. In other embodiments, the remote electronic device comprises a security door 424. The remote electronic device can be a secure parcel receptacle 425, such as a strong box with a one-way door.

Where the parcel delivery location is monitored by a concierge or doorman, the remote electronic device can comprise a concierge notification system 426 such as a computer or other electronic device that alerts the concierge or doorman to the fact that a parcel is soon to be delivered. The remote electronic device can comprise a smart door lock 427, which allows a parcel delivery person to unlock the same when an authenticated electronic device is detected by the smart door lock 427. A parking control system 428 is another example of a remote electronic device that can receive an electronic entry system control communique, thereby allowing a parcel delivery vehicle that is authenticated into the parking area for parcel delivery purposes.

At optional step 405, the method 400 can comprise causing, by one or more processors, a timer to start when the duration defined by the one or more delivery event relevant data fields extracted at step 402 from the electronic communication relating to the parcel delivery detected at step 401 commences. When the timer expires without the parcel having been delivered, the one or more processors can cause the presentation of a delivery missed alert on a user interface of the electronic device, can extend the timer in response to user input, and/or can cause the communication device to transmit an electronic entry system control revocation communique to the remote electronic device as previously described.

Decision 406 detects, by one or more processors of an electronic device from other signals received from the communication device of the electronic device, whether another electronic communication confirming the parcel delivery occurs, optionally prior to the expiration of the timer if employed. Where it does, step 407 can provide various actions, each of which can be performed alone or in various combinations.

In one or more embodiments, step 407 comprises simply stopping the timer. In one or more embodiments, step 407 comprises causing, by the one or more processors, the presentation of a parcel delivery alert on the user interface of the electronic device. Other similar operations will be obvious to those of ordinary skill in the art having the benefit of this disclosure.

Where the parcel is not delivered, as determined by decision 406, various other operations can occur. Illustrating by example, in one or more embodiments at step 408 the one or more processors can present a delivery missed alert on a user interface of the electronic device. In one or more embodiments, the delivery missed alert presents one or more user actuation targets allowing a user to reschedule the parcel's delivery. At step 409, the one or more processors can revoke the electronic entry system control communique created at step 403. Other operations that can be performed in response to parcel delivery failure will be obvious to those of ordinary skill in the art having the benefit of this disclosure.

Figure 5:
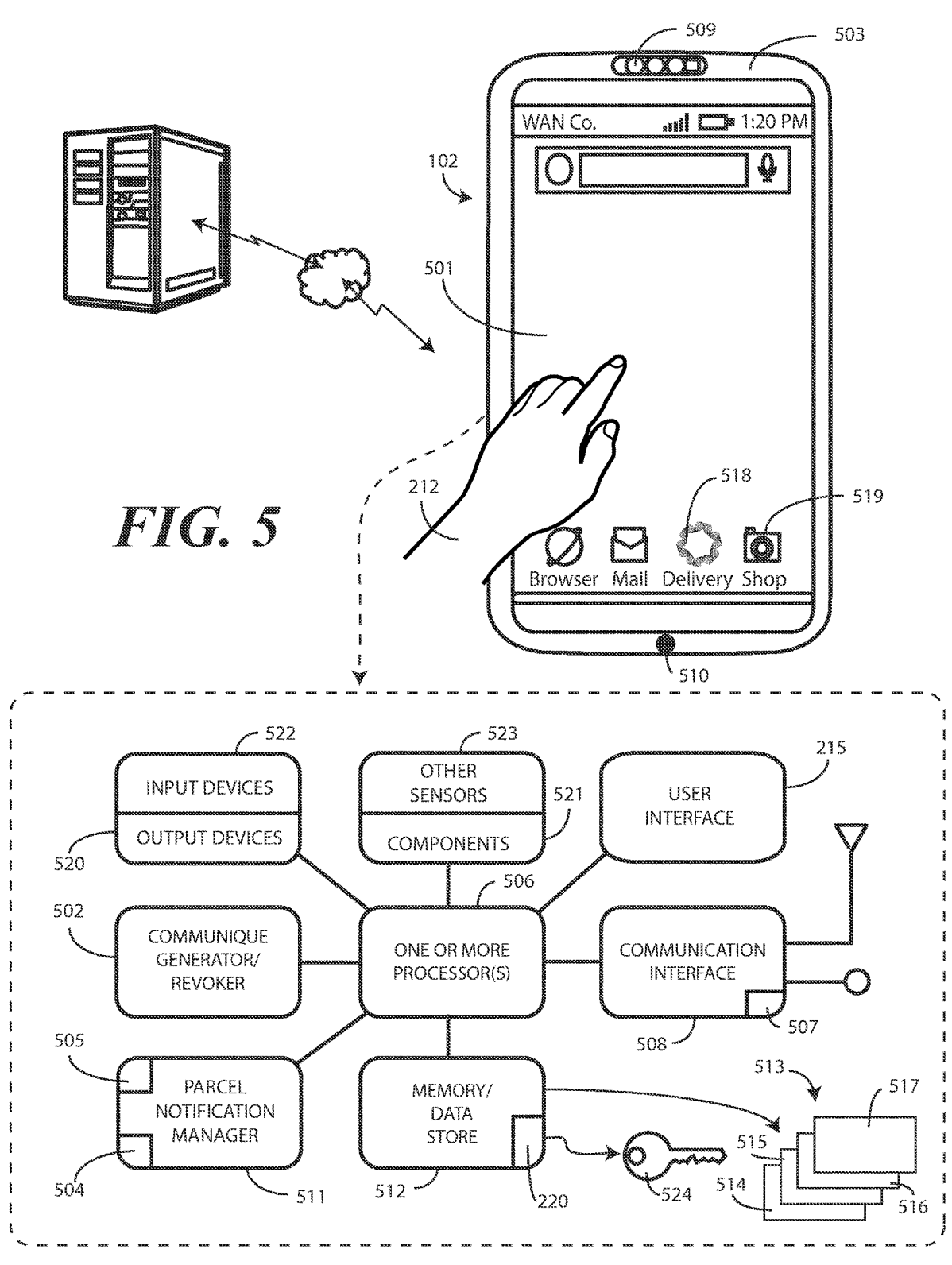
FIG. 5 illustrates one explanatory electronic device configured in accordance with one or more embodiments of the disclosure.

Turning now to FIG. 5, illustrated therein is one electronic device 102 configured in accordance with one or more embodiments of the disclosure. The electronic device 102 of this illustrative embodiment includes a user interface 215. In one or more embodiments, the user interface 215 comprises a display 501, which may optionally be touch-sensitive. The display 501 can serve as a primary user interface 215 of the electronic device 102.

Where the display 501 is touch sensitive, users can deliver user input to the display 501 by delivering touch input from a finger, stylus, or other objects disposed proximately with the display. In one embodiment, the display 501 is configured as an active-matrix organic light emitting diode (AMO-LED) display. However, it should be noted that other types of displays, including liquid crystal displays, would be obvious to those of ordinary skill in the art having the benefit of this disclosure.

The explanatory electronic device 102 of FIG. 2 includes a housing 503. Features can be incorporated into the housing 503. Examples of features that can be included along the housing 503 include an imager 509, shown as a camera in FIG. 5, or an optional speaker port. A user interface component 510, which may be a button or touch sensitive surface, can also be disposed along the housing 503.

A block diagram schematic of the electronic device 102 is also shown in FIG. 5. In one embodiment, the electronic device 102 includes one or more processors 506. In one embodiment, the one or more processors 506 can include an application processor and, optionally, one or more auxiliary processors.

One or both of the application processor or the auxiliary processor(s) can include one or more processors. One or both of the application processor or the auxiliary processor(s) can be a microprocessor, a group of processing components, one or more Application Specific Integrated Circuits (ASICs), programmable logic, or other type of processing device. The application processor and the auxiliary processor(s) can be operable with the various components of the electronic device 102. Each of the application processor and the auxiliary processor(s) can be configured to process and execute executable software code to perform the various functions of the electronic device 102. A storage device, such as memory 512, can optionally store the executable software code used by the one or more processors 506 during operation.

In this illustrative embodiment, the electronic device 102 also includes a communication device 508 that can be configured for wired or wireless communication with one or more other devices or networks. The networks can include a wide area network, a local area network, and/or personal area network.

The communication device 508 may also utilize wireless technology for communication, such as, but are not limited to, peer-to-peer, or ad hoc communications such as HomeRF, Bluetooth and IEEE 802.11 based communication, or alternatively via other forms of wireless communication such as infrared technology. The communication device 508 can include wireless communication circuitry, one of a receiver, a transmitter, or transceiver, and one or more antennas.

The electronic device 102 can optionally include a near field communication circuit 507 used to exchange data, power, and electrical signals between the electronic device 102 and another electronic device. In one embodiment, the near field communication circuit 507 is operable with a wireless near field communication transceiver, which is a form of radio-frequency device configured to send and receive radio-frequency data to and from the companion electronic device or other near field communication objects.

Where included, the near field communication circuit 507 can have its own near field communication circuit controller in one or more embodiments to wirelessly communicate with companion electronic devices using various near field communication technologies and protocols. The near field communication circuit 507 can include—as an antenna—a communication coil that is configured for near-field communication at a particular communication frequency. The term "near-field" as used herein refers generally to a distance of less than about a meter or so. The communication coil communicates by way of a magnetic field emanating from the communication coil when a current is applied to the coil.

A communication oscillator applies a current waveform to the coil. The near field communication circuit controller may further modulate the resulting current to transmit and receive data, power, or other communication signals with companion electronic devices.

In one embodiment, the one or more processors 506 can be responsible for performing the primary functions of the electronic device 102. For example, in one embodiment the one or more processors 506 comprise one or more circuits operable to present presentation information, such as images, text, and video, on the display 501. The executable software code used by the one or more processors 506 can be configured as one or more modules 513 that are operable with the one or more processors 506. Such modules 513 can store instructions, control algorithms, and so forth.

In one embodiment, the one or more processors 506 are responsible for running the operating system environment 514. The operating system environment 514 can include a kernel, one or more drivers, and an application service layer 515, and an application layer 516. The operating system environment 514 can be configured as executable code operating on one or more processors or control circuits of the electronic device 102.

The application service layer 515 can be responsible for executing application service modules. The application service modules may support one or more applications 517 or "apps." Examples of such applications include a cellular telephone application for making voice telephone calls, a web browsing application configured to allow the user to view webpages on the display 501 of the electronic device 102, an electronic mail application configured to send and receive electronic mail, a photo application configured to organize, manage, and present photographs on the display 501 of the electronic device 102, and a camera application for capturing images with the imager 509. Collectively, these applications constitute an "application suite."

In one or more embodiments, these applications comprise one or more electronic commerce/shopping applications 519 and/or parcel delivery applications 518 that allow a user 212 of the electronic device 102 to order items and have them delivered as parcels. Illustrating by example, in one or more embodiments a user can deliver user input to an electronic commerce/shopping application 519 and/or parcel delivery application 518 to cause a parcel ordering data structure to be transferred to a remote electronic device across a network. In one or more embodiments, when this occurs the communication device 508 will receive one or more electronic communications relating to a parcel delivery 505, which can be managed by a parcel notification manager 511. As previously described, the one or more processors can extract one or more delivery event relevant data fields 504 from the one or more electronic communication relating to the parcel delivery 505, examples of which include at least a parcel delivery time and a parcel delivery location.

In one or more embodiments, operating in conjunction with a communique generator/revoker 502, the one or more processors 506 can generate an electronic entry system control communique 220 from the one or more delivery event relevant data fields 504 and can cause the communication device 508 to transmit the electronic entry system control communique 220 to an electronic entry system. In one or more embodiments, the electronic entry system control communique 220 comprises a security key 524, one example of which is a QR code, allowing entry through an entry control system situated at the parcel delivery location at the parcel delivery time. In one or more embodiments, the electronic entry system control communique 220 is valid only for a predefined duration spanning the parcel delivery time.

In one or more embodiments, the one or more processors 506 are responsible for managing the applications and all personal information used by the electronic commerce/ shopping applications 519 and/or parcel delivery applications 518. The one or more processors 506 can also be responsible for launching, monitoring and killing the various applications and the various application service modules.

In one or more embodiments, the one or more processors 506 are operable to not only kill the applications, but also to expunge any and all personal data, data, files, settings, or other configuration tools when the electronic device 102 is reported stolen or when the electronic commerce/shopping application 519 and/or parcel delivery application 518 are used with fraudulent activity to wipe the memory 512 clean of any personal data, preferences, or settings of the person previously using the electronic device 102.

The one or more processors 506 can also be operable with other components 521. The other components 521, in one embodiment, include input components 522, which can include acoustic detectors as one or more microphones. The one or more processors 506 may process information from the other components 521 alone or in combination with other data, such as the information stored in the memory 512 or information received from the user interface.

The other components 521 can include a video input component such as an optical sensor, another audio input component such as a second microphone, and a mechanical input component such as button. The other components 521 can include one or more sensors 523, which may include key selection sensors, touch pad sensors, capacitive sensors, motion sensors, and switches. Similarly, the other components 521 can include video, audio, and/or mechanical outputs 520.

The one or more sensors 523 may include, but are not limited to, accelerometers, touch sensors, surface/housing capacitive sensors, audio sensors, and video sensors. Touch sensors may be used to indicate whether the electronic device 102 is being touched at side edges. The other components 521 of the electronic device can also include a device interface to provide a direct connection to auxiliary components or accessories for additional or enhanced functionality and a power source, such as a portable battery, for providing power to the other internal components and allow portability of the electronic device 102.

It is to be understood that FIG. 5 is provided for illustrative purposes only and for illustrating components of one electronic device 102 in accordance with embodiments of the disclosure and is not intended to be a complete schematic diagram of the various components required for an electronic device. Therefore, other electronic devices in accordance with embodiments of the disclosure may include various other components not shown in FIG. 5 or may include a combination of two or more components or a division of a particular component into two or more separate components, and still be within the scope of the present disclosure.

As noted above, various alerts and notifications can be presented on the user interface 215 of the electronic device 102 in response to certain conditions occurring and detected by the methods described above. Examples of some of these notifications or alerts are shown in FIGS. 6-9. These examples are illustrative only, as numerous others will be obvious to those of ordinary skill in the art having the benefit of this disclosure.

Figure 6:
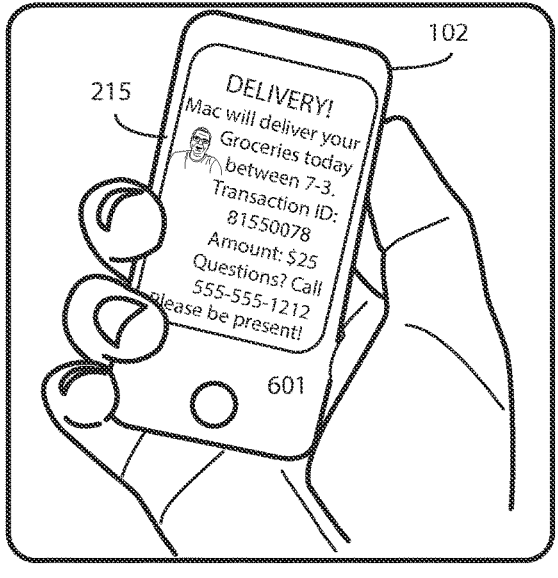

Beginning with FIG. 6, illustrated therein is a user interface 215 of an electronic device 102 configured in accordance with one or more embodiments of the disclosure presenting an electronic communication relating to a parcel delivery 601. In this illustrative embodiment, the electronic communication relating to the parcel delivery 601 identifies that a delivery is imminent. It indicates who will deliver the delivery, what the delivery is, and the parcel delivery time. It also includes a parcel order identifier in the form of a transaction identifier that a person can use to cross reference with an order list to confirm that the order was legitimately made. The price of the parcel is presented, along with delivery contact information in the form of a phone number should the recipient of the electronic communication relating to the parcel delivery 601 have questions.

Turning now to FIG. 7, illustrated therein a user interface 215 of an electronic device 102 configured in accordance with one or more embodiments of the disclosure presenting a delivery missed alert 701. As shown in FIG. 7, in this illustrative example the delivery missed alert 701 indicates that a parcel delivery has indeed been missed. It further explains that the delivery person, Mac, was supposed to deliver the parcel during duration spanning the parcel delivery time. In this example, the delivery missed alert 701 explains why the parcel delivery was missed, as well as the fact that a timer started by the one or more processors of the electronic device 102 has expired.

In this example, the delivery missed alert 701 explains that the electronic entry system control communique has been revoked, providing a confirmation of the same. However, a user actuation target 702 is being presented that allows the timer to be extended should the user desire. If this user actuation target 702, the validity of the electronic entry system control communique can be reinstated for the remaining duration of the timer.

Figure 8:
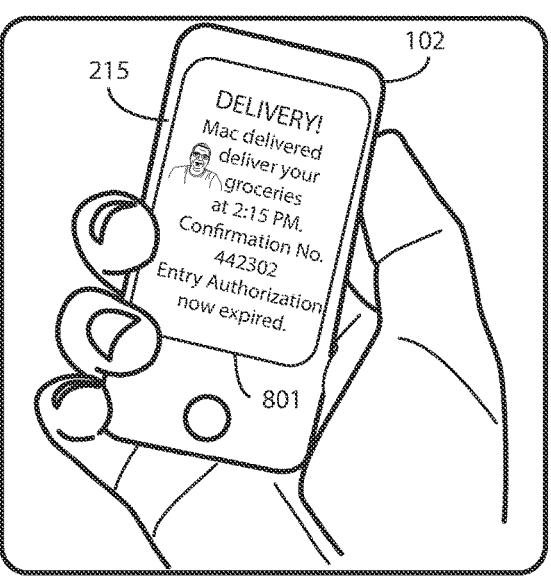

Turning now to FIG. 8, illustrated therein is a user interface 215 of an electronic device 102 configured in accordance with one or more embodiments of the disclosure presenting an electronic communication 801 confirming receipt of a parcel delivery. As shown, the electronic communication 801 indicates that a delivery has occurred, who made the delivery, when the delivery was made, and even includes a confirmation number confirming the delivery. In this illustrative embodiment, the electronic communication also notes that the electronic entry system control communique has been terminated or has become expired in response to the delivery being made or, more particularly, in response to the communication device of the electronic device 102 receiving the electronic communication 801.

Figure 9:
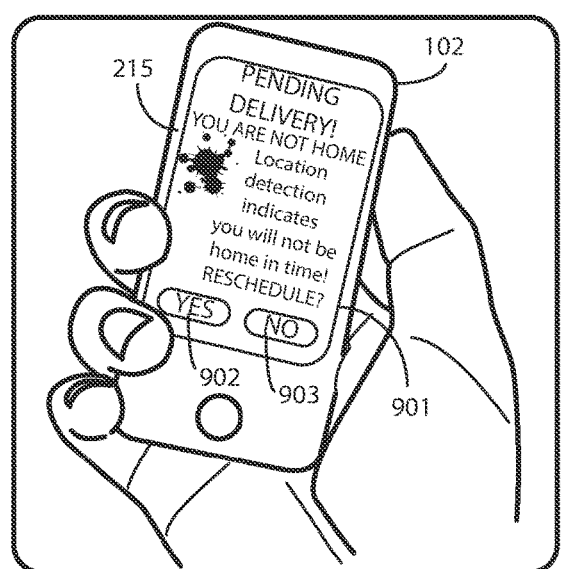

Turning now to FIG. 9, illustrated therein is a user interface 215 of an electronic device 102 configured in accordance with one or more embodiments of the disclosure presenting an impending delivery alert 901. As noted above, the impending delivery alert 901 can be presented in various circumstances, examples of which include when the electronic device 102 exits an established geofence, when the location of the electronic device 102 fails to correspond with a parcel delivery location extracted from an electronic communication relating to a parcel delivery, or for other reasons.

In this illustrative embodiment, the impending delivery alert 901 indicates that a delivery is pending. It also provides a reason why the impending delivery alert 901 is being presented, which in this example is because the location of the electronic device 102 fails to correspond to the parcel delivery location. In one or more embodiments, one or more user actuation targets 902,903 allowing a user to reschedule the parcel delivery are provided as well. A logo of the supplier is presented on the impending delivery alert 901 in this example to jog the user's memory in remembering what the parcel is and when it was ordered.

Figure 10:
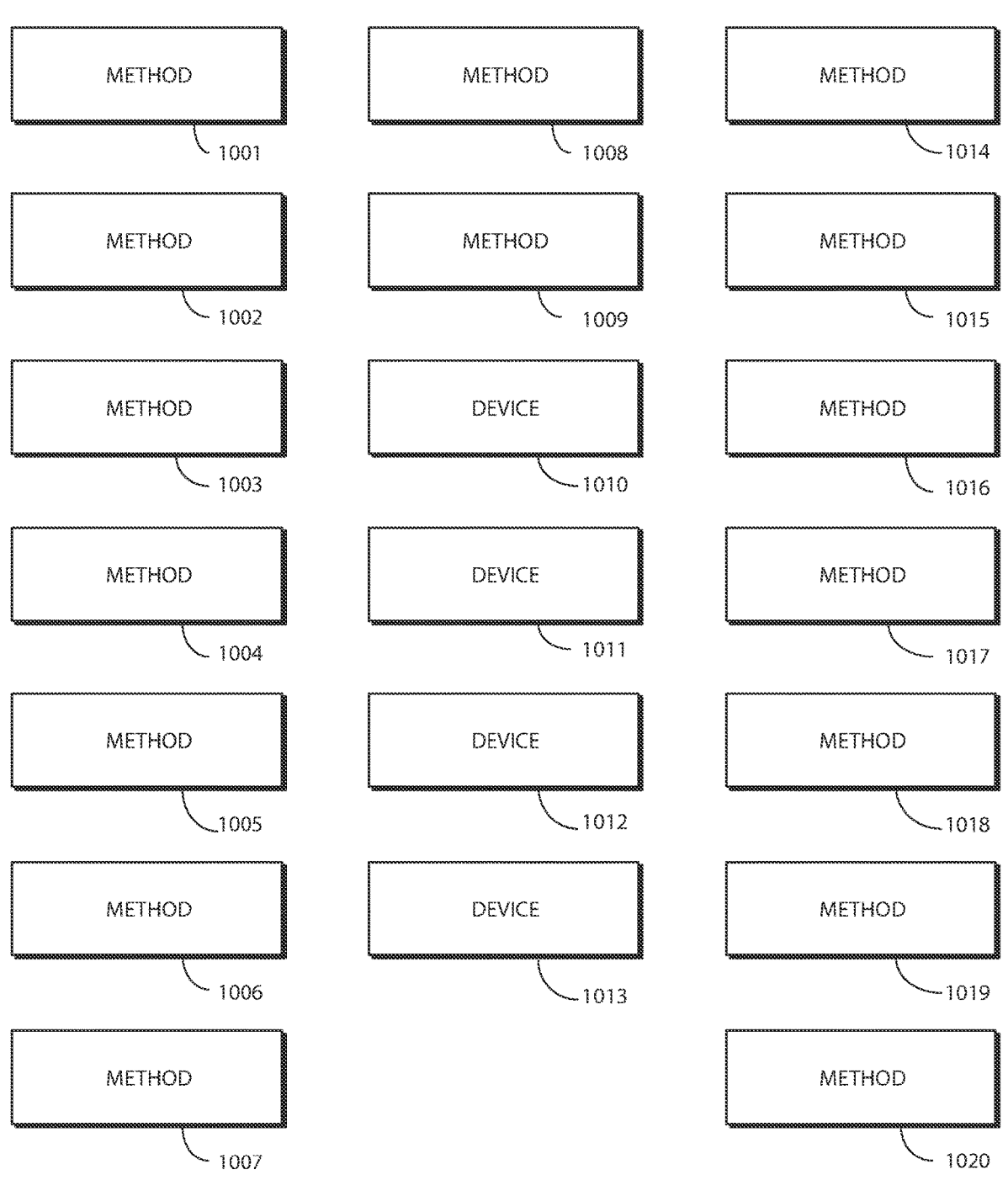
FIG. 10 illustrates various embodiments of the disclosure.

Turning now to FIG. 10, illustrated therein are various embodiments of the disclosure. The embodiments of FIG. 10 are shown as labeled boxes in FIG. 10 due to the fact that the individual components of these embodiments have been illustrated in detail in FIGS. 1-9, which precede FIG. 10. Accordingly, since these items have previously been illustrated and described, their repeated illustration is no longer essential for a proper understanding of these embodiments. Thus, the embodiments are shown as labeled boxes.

At 1001, a method in an electronic device comprises detecting, by one or more processors of the electronic device from signals received from a communication device of the electronic device, receipt by the communication device of an electronic communication relating to a parcel delivery. At 1001, the method comprises extracting, by the one or more processors, one or more delivery event relevant data fields from the electronic communication relating to the parcel delivery.

At 1001, the method comprises constructing, by the one or more processors, an electronic entry system control communique as a function of the one or more delivery event relevant data fields extracted from the electronic communication relating to the parcel delivery. At 1001, the method comprises causing, by the one or more processors, the communication device to transmit the electronic entry system control communique to a remote electronic device. At 1001, the electronic entry system control communique is valid only for a duration defined by the one or more delivery event relevant data fields extracted from the electronic communication relating to the parcel delivery.

At 1002, the method of 1001 further comprises causing, by the one or more processors, a timer to start when the duration defined by the one or more delivery event relevant data fields extracted from the electronic communication relating to the parcel delivery commences. At 1003, the method of 1002 further comprises, in response to detecting the timer expiring, causing, by the one or more processors, presentation of a delivery missed alert on a user interface of the electronic device. At 1004, the method of 1002 further comprises, in response to detecting the timer expiring, causing, by the one or more processors, the communication device to transmit an electronic entry system control revocation communique to the remote electronic device.

At 1005, the method of 1002 further comprises also detecting, by the one or more processors of the electronic device from other signals received from the communication device of the electronic device, receipt by the communication device of another electronic communication confirming the parcel delivery and stopping the timer. At 1006, the method of 1002 further comprises also detecting, by the one or more processors of the electronic device from other signals received from the communication device of the electronic device, receipt by the communication device of another electronic communication confirming the parcel delivery prior to expiration of the timer and causing, by the one or more processors, presentation of a parcel delivery alert on a user interface of the electronic device.

At 1007, the electronic entry system control communique of 1001 comprises a quick response (QR) code. At 1008, the remote electronic device of 1001 comprises an automatic premises entry allowance device. At 1009, the automatic premises entry allowance device of 1008 comprises an automatic gate.

At 1010, an electronic device comprises a communication device, a user interface, and one or more processors operable with the communication device and the user interface. At 1010, the one or more processors are configured to extract, from an electronic communication relating to a parcel delivery received by the communication device, at least a parcel delivery time and a parcel delivery location and cause the communication device to transmit an electronic entry system control communique allowing entry through an entry control system situated at the parcel delivery location at the parcel delivery time to the entry control system. At 1010, the electronic entry system control communique is valid only for a predefined duration spanning the parcel delivery time.

At 1011, the one or more processors of 1010 are further configured to revoke the electronic entry system control communique upon expiration of the predefined duration. At 1012, the one or more processors of 1010 are configured to cause the communication device to transmit the electronic entry system control communique allowing entry through the entry control system situated at the parcel delivery location at the parcel delivery time to the entry control system when the electronic device is situated at the parcel delivery location. By contrast, at 1013, the one or more processors of 1010 are further configured to cause the user interface to present a parcel delivery alert when the electronic device is situated more than a predetermined distance from the parcel delivery location when the electronic communication relating to the parcel delivery is received by the communication device.

At 1014, a method in an electronic device comprises detecting, by one or more processors of the electronic device from signals received from a communication device of the electronic device, receipt by the communication device of an electronic communication relating to a parcel delivery. At 1014, the method comprises extracting, by the one or more processors, one or more delivery event relevant data fields from the electronic communication relating to the parcel delivery.

At 1014, the method comprises determining, by the one or more processors from one or more sensors of the electronic device, whether a location of the electronic device corresponds to a delivery location extracted from the one or more delivery event relevant data fields. At 1014, the method comprises, when the location of the electronic device corresponds to the delivery location extracted from the one or more delivery event relevant data fields, establishing, by the one or more processors, a geofence about the location.

At 1015, the method of 1014 further comprises, when the location of the electronic device corresponds to the delivery location extracted from the one or more delivery event relevant data fields, constructing, by the one or more processors, an electronic entry system control communique as a function of the one or more delivery event relevant data fields extracted from the electronic communication relating to the parcel delivery. At 1015, the method comprises causing, by the one or more processors, the communication device to transmit the electronic entry system control communique to a remote electronic device.

At 1016, the method of 1015 further comprises, when the electronic device exits the geofence, causing, by the one or more processors, presentation of an impending delivery alert on a user interface of the electronic device. At 1017, the impending delivery alert of 1016 comprises one or more user actuation targets that, when actuated, cause a revocation of the electronic entry system control communique. At 1018, the method of 1017 further comprises, in response to actuation of the one or more user actuation targets, terminating, by the one or more processors, the geofence about the location.

At 1019, the method of 1014 further comprises, when the location fails to correspond to the delivery location extracted from the one or more delivery event relevant data fields, causing, by the one or more processors, presentation of an impending delivery alert on a user interface of the electronic device. At 1020, the electronic entry system control communique of 1015 is valid only for a predefined duration.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. For example.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. A method in an electronic device, the method comprising:

extracting, by one or more processors, at least a parcel delivery time and a parcel delivery location from an electronic communication relating to a parcel delivery; and causing, by the one or more processors, a communication device to transmit an electronic entry system control communique allowing entry through an entry control system situated at the parcel delivery location at the parcel delivery time to the entry control system;

wherein the electronic entry system control communique is valid only for a duration that includes the parcel delivery time; and the one or more processors present a delivery missed alert on a user interface of the electronic device upon expiration of the duration.

2. The method of claim 1, further comprising causing, by the one or more processors, a timer to start when the duration commences.

3. The method of claim 2, wherein determining the expiration of the duration comprises detecting the timer expiring.

4. The method of claim 2, further comprising, in response to detecting the timer expiring, causing, by the one or more processors, the communication device to transmit an electronic entry system control revocation communique to the entry control system.

5. The method of claim 2, further comprising:

also detecting, by the one or more processors of the electronic device from other signals received from the communication device of the electronic device, receipt by the communication device of another electronic communication confirming the parcel delivery; and stopping the timer.

6. The method of claim 2, further comprising:

also detecting, by the one or more processors of the electronic device from other signals received from the communication device of the electronic device, receipt by the communication device of another electronic communication confirming the parcel delivery prior to expiration of the timer; and causing, by the one or more processors, presentation of a parcel delivery alert on a user interface of the electronic device.

7. The method of claim 1, wherein the electronic entry system control communique comprises a quick response (QR) code.

8. The method of claim 1, wherein the entry control system comprises an automatic premises entry allowance device.

9. The method of claim 8, wherein the automatic premises entry allowance device comprises an automatic gate.

10. An electronic device, comprising:

a communication device;

a user interface; and one or more processors operable with the communication device and the user interface;

wherein the one or more processors are configured to extract, from an electronic communication relating to a parcel delivery received by the communication device, at least a parcel delivery time and a parcel delivery location and cause the communication device to transmit an electronic entry system control communique allowing entry through an entry control system situated at the parcel delivery location at the parcel delivery time to the entry control system;

wherein the electronic entry system control communique is valid only for a predefined duration spanning the parcel delivery time; and the one or more processors present a delivery missed alert on the user interface of the electronic device upon expiration of the predefined duration.

11. The electronic device of claim 10, wherein the one or more processors are further configured to revoke the electronic entry system control communique upon expiration of the predefined duration.

12. The electronic device of claim 10, wherein the one or more processors are configured to cause the communication device to transmit the electronic entry system control communique allowing entry through the entry control system situated at the parcel delivery location at the parcel delivery time to the entry control system when the electronic device is situated at the parcel delivery location.

13. The electronic device of claim 10, wherein the one or more processors are further configured to cause the user interface to present a parcel delivery alert when the electronic device is situated more than a predetermined distance from the parcel delivery location when the electronic communication relating to the parcel delivery is received by the communication device.

14. A method in an electronic device, the method comprising:

detecting, by one or more processors of the electronic device from signals received from a communication device of the electronic device, receipt by the communication device of an electronic communication relating to a parcel delivery;

extracting, by the one or more processors, one or more delivery event relevant data fields from the electronic communication relating to the parcel delivery;

determining, by the one or more processors from one or more sensors of the electronic device, whether a location of the electronic device corresponds to a delivery location extracted from the one or more delivery event relevant data fields; and when the location of the electronic device corresponds to the delivery location extracted from the one or more delivery event relevant data fields, establishing, by the one or more processors, a geofence about the location.

15. The method of claim 14, further comprising, when the location of the electronic device corresponds to the delivery location extracted from the one or more delivery event relevant data fields:

constructing, by the one or more processors, an electronic entry system control communique as a function of the one or more delivery event relevant data fields extracted from the electronic communication relating to the parcel delivery; and causing, by the one or more processors, the communication device to transmit the electronic entry system control communique to a remote electronic device.

16. The method of claim 15, further comprising, when the electronic device exits the geofence, causing, by the one or more processors, presentation of an impending delivery alert on a user interface of the electronic device.

17. The method of claim 16, the impending delivery alert comprising one or more user actuation targets that, when actuated, cause a revocation of the electronic entry system control communique.

18. The method of claim 17, further comprising, in response to actuation of the one or more user actuation targets, terminating, by the one or more processors, the geofence about the location.

19. The method of claim 14, further comprising, when the location fails to correspond to the delivery location extracted from the one or more delivery event relevant data fields, causing, by the one or more processors, presentation of an impending delivery alert on a user interface of the electronic device.

20. The method of claim 15, wherein the electronic entry system control communique is valid only for a predefined duration.

* * * * *